(12) United States Patent
Voorheis et al.

(10) Patent No.: US 10,444,346 B2
(45) Date of Patent: Oct. 15, 2019

(54) METHOD FOR MIGRATING RADAR SENSOR LIMITATIONS WITH VIDEO CAMERA INPUT FOR ACTIVE BRAKING FOR PEDESTRIANS

(71) Applicant: Robert Bosch GmbH, Stuttgart (DE)

(72) Inventors: Thomas Voorheis, Livonia, MI (US); Oliver F. Schwindt, Palo Alto, CA (US)

(73) Assignee: Robert Bosch GmbH, Stuttgart (DE)

( * ) Notice: Subject to any disclaimer, the term of this patent is extended or adjusted under 35 U.S.C. 154(b) by 269 days.

(21) Appl. No.: 15/327,914

(22) PCT Filed: Jul. 21, 2015

(86) PCT No.: PCT/US2015/041355
§ 371 (c)(1),
(2) Date: Jan. 20, 2017

(87) PCT Pub. No.: WO2016/014548
PCT Pub. Date: Jan. 28, 2016

(65) Prior Publication Data
US 2017/0205506 A1    Jul. 20, 2017

Related U.S. Application Data

(60) Provisional application No. 62/029,227, filed on Jul. 25, 2014.

(51) Int. Cl.
*G01S 13/93* (2006.01)
*G01S 13/86* (2006.01)
(Continued)

(52) U.S. Cl.
CPC ............ *G01S 13/931* (2013.01); *G01S 13/66* (2013.01); *G01S 13/867* (2013.01); *G01S 13/87* (2013.01);
(Continued)

(58) Field of Classification Search
CPC .............................. G01S 13/66; G01S 13/867
See application file for complete search history.

(56) References Cited

U.S. PATENT DOCUMENTS 3,448,822 A    6/1969  La Lone et al.
6,035,053 A *  3/2000  Yoshioka ............ B60K 31/0008
                                                340/435
(Continued)

FOREIGN PATENT DOCUMENTS

CN    103479360 A    1/2014
CN    103837872 A    6/2014
EP      1944721 A2    7/2008

OTHER PUBLICATIONS

International Search Report and Written Opinion for Application No. PCT/US2015/041355 dated Oct. 30, 2015 (11 pages).
(Continued)

*Primary Examiner* — Marcus E Windrich
(74) *Attorney, Agent, or Firm* — Michael Best & Friedrich LLP (57) ABSTRACT

A pedestrian collision avoidance system for a vehicle including a radar sensor, a video camera, and an electronic control unit (ECU). The ECU detects an object in the video information and classifies the object as a pedestrian based on a comparison of the video information with a database. The ECU determines a distance to the pedestrian based on the radar information and determines a characteristic of the pedestrian based on the video information, the distance, and the database. When the pedestrian ceases to be detected by the radar sensor, the ECU determines an updated distance to the pedestrian based on the video information and the characteristic of the pedestrian. The ECU determines whether a potential for collision exists between the vehicle and the pedestrian based in part on the distance to the
(Continued)

pedestrian, and when the potential for collision is present, the ECU activates an automatic vehicle response.

24 Claims, 6 Drawing Sheets

(51) Int. Cl.
  *G01S 13/66* (2006.01)
  *G01S 13/87* (2006.01)
(52) U.S. Cl.
  CPC ............... *G01S 2013/9346* (2013.01); *G01S 2013/9367* (2013.01); *G01S 2013/9375* (2013.01); *G01S 2013/9378* (2013.01)

(56) References Cited

U.S. PATENT DOCUMENTS

| | | |
|---|---|---|
| 7,660,438 B2 | 2/2010 | Camus |
| 9,798,002 B2 | 10/2017 | Baba |
| 9,798,935 B2 | 10/2017 | Sandahl et al. |
| 2005/0232463 A1* | 10/2005 | Hirvonen ............. G06K 9/3241 |
| | | 382/103 |
| 2008/0166024 A1* | 7/2008 | Iketani ................... B60R 1/00 |
| | | 382/107 |
| 2010/0007728 A1 | 1/2010 | Strauss et al. |
| 2010/0020170 A1* | 1/2010 | Higgins-Luthman ....................... B60Q 1/1423 |
| | | 348/135 |
| 2011/0184617 A1* | 7/2011 | Hegemann ............... B60T 7/22 |
| | | 701/70 |
| 2012/0035846 A1* | 2/2012 | Sakamoto ........... B60T 8/17558 |
| | | 701/301 |
| 2013/0329960 A1 | 12/2013 | Sandahl et al. |
| 2014/0035777 A1* | 2/2014 | Kim ....................... G01S 13/93 |
| | | 342/146 |
| 2014/0139369 A1 | 5/2014 | Baba |
| 2015/0161447 A1* | 6/2015 | Fu ............................ G06K 9/46 |
| | | 382/103 |

OTHER PUBLICATIONS

Office Action from the European Patent Office for Application No. 15744450.6 dated Mar. 28, 2018 (6 pages).

First Office Action from the National Intellectual Property Office, P.R. China for Application No. 201580040464.8 dated Sep. 3, 2018 (15 pages).

* cited by examiner

METHOD FOR MIGRATING RADAR SENSOR LIMITATIONS WITH VIDEO CAMERA INPUT FOR ACTIVE BRAKING FOR PEDESTRIANS

The present application claims priority to U.S. Provisional Patent Application No. 62/029,227 filed on Jul. 25, 2014, the entire contents of which are incorporated herein by reference.

BACKGROUND

The present invention relates to systems and methods for automatically detecting pedestrians with vehicle sensors.

SUMMARY

In modern vehicles, various safety systems are being incorporated into the design and construction of vehicles. Among the safety systems are pedestrian detection and response systems, also called active braking systems for pedestrians. An active braking system for pedestrians automatically senses and detects a presence of a pedestrian in a direction of travel of a vehicle. Upon detection, an electronic control unit tracks the pedestrian and continuously accesses whether there is a danger of collision between the vehicle and the pedestrian. If such a danger is present, the electronic control unit automatically activates a braking system of the vehicle. However, even with modern image detection and recognition techniques, determination of the potential for collision is difficult based solely on video detection systems.

Embodiments of the present invention relate to a method and a system for mitigating radar sensor limitations with video camera input for active braking systems in vehicles equipped with pedestrian detection. Radar sensors are configured to have long-range sensing capabilities. To achieve long-range sensing, radar sensors may have a limited opening angle that restricts their field of view. The limited opening angle may prevent detection of close-range objects. In particular, pedestrians that are displaced laterally to the radar opening are not visible to the radar sensor. Therefore, long-range radar sensors operating independently of other sensing systems are not ideal for pedestrian sensing in active braking systems.

Video detection and radar detection of pedestrians and other objects may provide superior detection and tracking ability for the active braking system for pedestrians. These systems in conjunction help compensate for limitations present in each detection system. Video detection has a wider angle of view than that provided by long-range radar sensors. Video detection allows the active braking system for pedestrians to detect pedestrians at close and medium ranges and at a further distance from a center-line of the detection system. Video detection of pedestrians is achieved by analyzing a series of images (i.e., video information) from a video camera. In such cases, an electronic control unit (ECU) analyzes a plurality of frames from a video stream being produced by the video camera in order to detect, classify, and track objects. The ECU may classify an object as a pedestrian object based on information about similar objects located in a database accessible to the ECU.

However, video detection has inherent limitations in accuracy for determining real world distances based on the video information. In particular, distances between the camera and an object may be difficult to determine. Video detection may rely on determining a point of intersection between the pedestrian and a ground plane (e.g., a road surface). Using the point of intersection and an analysis of the ground plane, the ECU determines an estimated distance to the pedestrian. In such a case, the ECU determines an orientation of the ground plane and a shape of the ground plane and uses these determinations to determine the estimated distance. This method can provide reliable estimated distances in ideal conditions, such as when estimating a distance to a pedestrian over a flat, even road surface. However, sharp changes in elevation between the vehicle and the pedestrian can interfere with the accuracy of the determination of the estimated distance. In addition, sharp changes in elevation at other points within the field of view of the video camera may deteriorate the accuracy of the estimated distance. In another situation, when the pedestrian is on a surface that is not part of the ground plane that the ECU has analyzed, the estimated distance is even less accurate than the estimated distance that was determined with sharp elevation changes present. For example, if a pedestrian is on a sidewalk that is raised or lowered in height by a significant amount from the height of the road surface, the ECU may inaccurately determine the point of intersection of the pedestrian and the road surface. An inaccurate estimated distance then follows from the inaccurate point of intersection. Therefore, both of these methods of estimating distance from a video signal include inherent limitations or inaccuracies in certain conditions.

To correct for these limitations and inaccuracies, embodiments of the invention provide for methods using combinations of video signals and radar signals to determine an estimated distance to a pedestrian. In particular, the ECU may identify a pedestrian using the video signal and detect the same pedestrian using the long-range radar sensor. In such a case, the ECU combines radar information with video information to better determine an estimation of the distance to the pedestrian. Once the radar information and the video information are fused, the ECU determines a height of the pedestrian based on the distance from the radar information, the database, and the video information. The ECU stores the height determination in memory. The ECU then determines a potential for collision between the vehicle and the pedestrian based on a distance as determined based in part on the stored height determination. When the ECU determines that a collision is likely to occur, the ECU automatically controls the vehicle to prevent a collision. For example, the ECU may activate a braking system of the vehicle. The radar information and the video information are used to identify the potential for collision even when the pedestrian moves out of the field of view of the long-range radar.

In one embodiment, the invention provides a pedestrian collision safety system for a vehicle including a radar sensor positioned on the vehicle and a video camera positioned on the vehicle. The system also includes an electronic control unit (ECU) electrically connected to the radar sensor and the video camera. The electronic control unit is configured to sense a surrounding area of the vehicle with the radar sensor and the video camera and receive radar information from the radar sensor and video information from the video camera. The ECU detects an object in the video information and classifies the object as a pedestrian based on a comparison of the video information with a database. The ECU determines a distance to, based on the radar information, any objects that are classified as pedestrians and determines a characteristic of the pedestrian based on the video information, the distance, and the database. The ECU then records the characteristic of the pedestrian in memory. When the pedestrian ceases to be detected by the radar sensor, the ECU determines an updated distance to the pedestrian based on the video information and the characteristic of the pedestrian. The ECU determines whether a potential for collision between the vehicle and the pedestrian is present based in part on the distance to the pedestrian. When the potential for collision is present, The ECU activates an automatic vehicle response.

In another embodiment the invention provides a method of operating a pedestrian collision safety system on a vehicle. The method includes sensing a surrounding area of the vehicle with a radar sensor and a video camera and sending radar information from the radar sensor and video information from the video camera to an electronic control unit. An object is detected in the video information and the object is classified as a pedestrian based on comparison with a database. A distance to an object classified as a pedestrian is determined based on the radar information and a characteristic of the pedestrian is determined based on the video information, the distance, and the database. The characteristic of the pedestrian is recorded in memory. When the pedestrian ceases to be detected by the radar sensor, an updated distance to the pedestrian is determined based on the video information and the characteristic of the pedestrian. A potential for collision between the vehicle and the pedestrian is determined to be present based in part on the distance to the pedestrian. When the potential for collision is present, an automatic vehicle response is activated.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

It should be noted that the term electronic control unit refers to hardware-based control circuitry integrated into an automotive electronic control unit for executing instructions to perform the methods described herein. For example, the electronic control unit may include a microprocessor, microcontroller, or other computing device. The electronic control unit may include one or more electronic control units, one or more memory modules including non-transitory computer-readable medium, one or more input/output interfaces, and various connections (e.g., a system bus) connecting the components.

Figure 1:
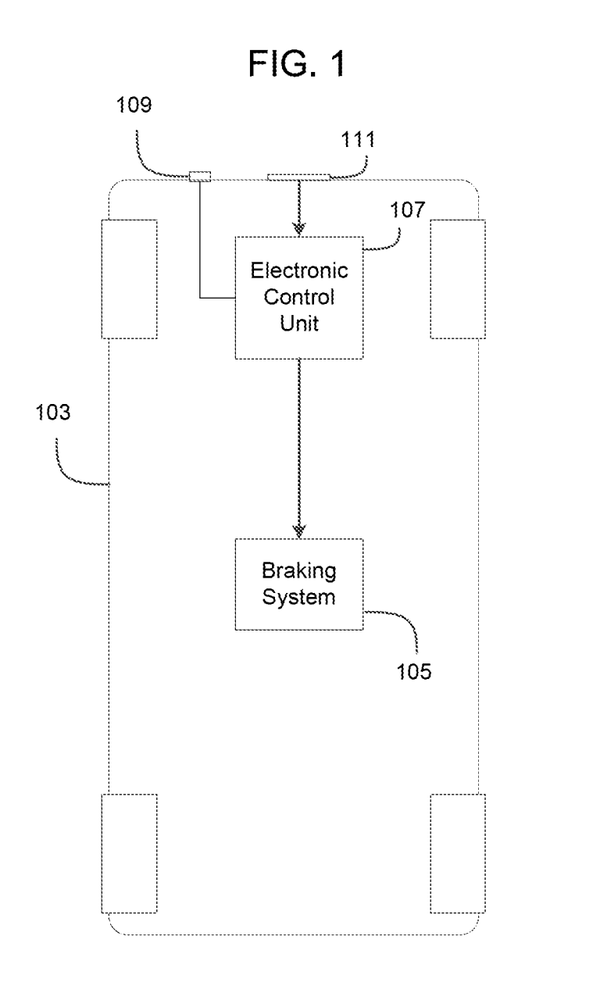
FIG. 1 is a block diagram of a vehicle equipped with an active braking system for pedestrians.

FIG. 1 illustrates a vehicle 103 equipped with an active braking system for pedestrians 100. The active braking system for pedestrians 100 includes a braking system 105, an electronic control unit (ECU 107), a radar sensor 109, and a video camera 111. The braking system 105 includes braking components not illustrated in FIG. 1, for example, brakes, brake lines, a braking controller, and a brake pedal. Embodiments of the invention may be configured to work with various styles and constructions of braking systems. These may include antilock braking systems, hydraulic braking systems, electronic braking systems, regenerative braking systems, and combinations of these systems and others. In such constructions, the electronic control unit 107 sends a signal to activate the braking system 105 in whichever form is necessary for operating the specific construction or style of braking system.

In some embodiments, the radar sensor 109 is positioned on the front of the vehicle 103. The radar sensor 109 may be a long-distance radar sensor and may be positioned to detect objects at medium and long ranges in front of the vehicle 103. Alternatively, the radar sensor 109 may include multiple radar sensors including one or more short-range radar sensors and/or rear-facing radar sensors. Similarly, the video camera 111 may be positioned on the front of the vehicle 103. The rear of the vehicle 103 may also include a video camera 111. The video camera 111 may be configured to detect objects at short to medium ranges both in front of and behind the vehicle 103. In some embodiments, the video camera 111 has a wider field of view than the radar sensor 109. In such embodiments, the video camera 111 can detect objects at larger view angles in the forward direction. For example, pedestrians located on a sidewalk adjacent to the vehicle 103 may be visible in the field of view of the video camera 111, but not in the field of view of the radar sensor 109.

Figure 2:
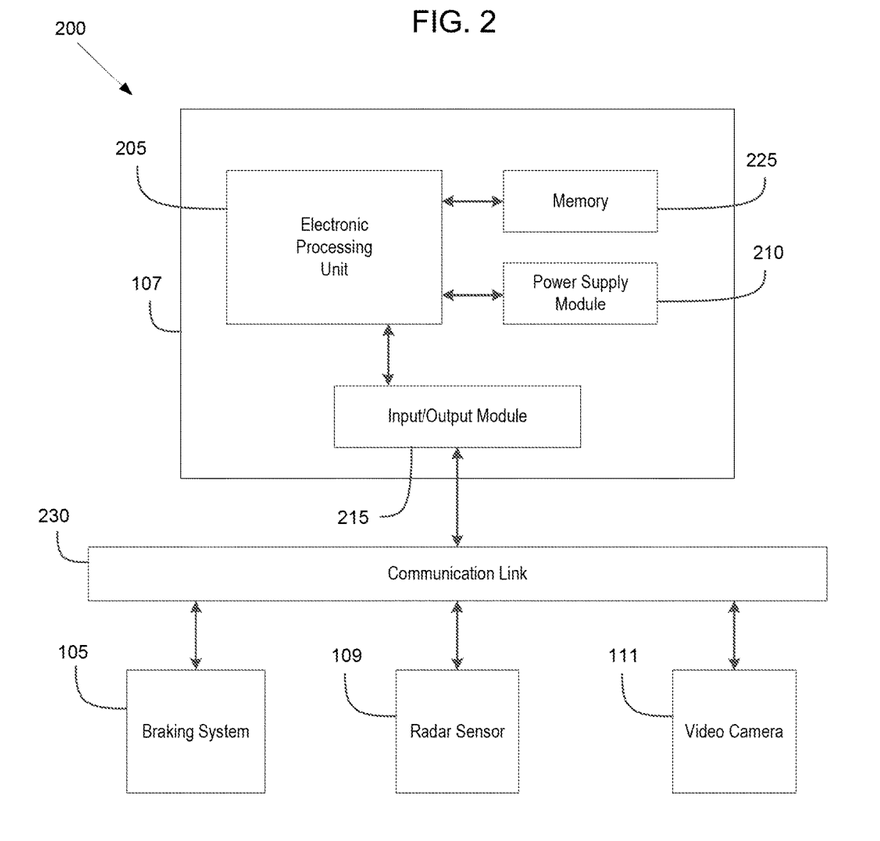
FIG. 2 is a block diagram of a control system for the active braking system for pedestrians of FIG. 1.

The ECU 107 is illustrated in FIG. 2. The ECU 107 is configured to receive radar information from the radar sensor 109 and video information from the video camera 111. The ECU 107 includes a plurality of electrical and electronic components that provide power, operation control, and protection to the components and modules within the ECU 107. The ECU 107 may also provide power, operational control, and protection to the radar sensor 109 and the video camera 111. In particular, the ECU 107 includes, among other things, an electronic processing unit 205 (e.g., a programmable microprocessor, microcontroller, or similar device), a power supply module 210, and an input/output module 215. The ECU 107 also includes non-transitory, machine-readable memory 225. The electronic processing unit 205 is communicatively coupled to the memory 225. The electronic processing unit 205 is configured to retrieve from memory 225 and execute, among other things, instructions related to the control processes and methods described herein. In some embodiments, the electronic processing unit 205 of the ECU 107 executes a program or algorithm to perform the method illustrated in FIGS. 4 and 5. In other embodiments, the ECU 107 includes additional, fewer, or different components. The memory 225 may contain a database including objects classified into groups with common sets of features, such as, for example, height, size, posture, position, shape, and others.

In the example illustrated in FIG. 2, a communication link 230 provides for a medium of communication between the braking system 105, the radar sensor 109, and the video camera 111. In such an embodiment, the input/output module 215 controls transmission and reception of signals from the communication link 230. The communication link 230 may communicate by means of a protocol such as J1939 or CAN bus for communicating with the input/output module 215. In other embodiments, the communication link 230 communicates with the input/output module 215 under other suitable protocols depending on the needs of the specific application. In some embodiments, the communication link 230 also inputs information from various other automotive controls and sensors.

In other examples, the braking system 105, the radar sensor 109, and the video camera 111 connect directly to the ECU 107, rather than through the communication link 230. In such cases, the ECU 107 may contain sub-modules or components that directly process the communications to and from each of these devices independently of the other devices. For example, the ECU 107 may receive video information from the video camera 111 at an image processing module (not illustrated), which performs various image processing techniques on the video information. The image processing module may coordinate with the electronic processing unit 205 to perform image processing, recognition, and tracking.

Figure 3:
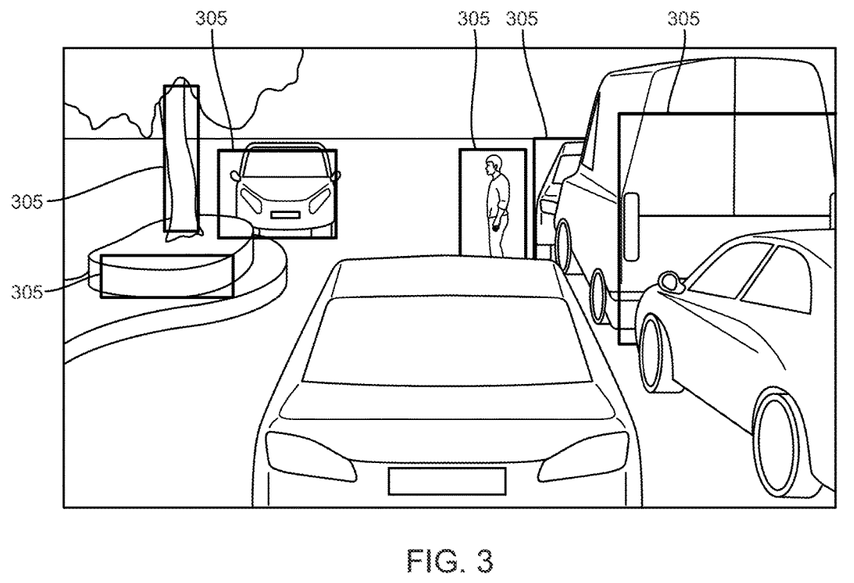
FIG. 3 is a diagram of detected objects by a video camera using bounding boxes of the active braking system for pedestrians of FIG. 1.

FIG. 3 is an example of a camera image that illustrates a portion of a monitoring process of the ECU 107. When camera information is received by the ECU 107, the ECU 107 detects or senses objects in the camera information. The ECU 107 detects objects by surrounding the object's perimeter with a bounding box 305. The bounding box 305 defines a perimeter of the sensed object. Each bounding box 305 illustrated in FIG. 3 highlights an object for analysis by the ECU 107. The bounding box 305 may be determined based on various image processing techniques, such as, comparing brightness and color of pixels form portions of the image. Once assigned a bounding box 305, the object can be tracked and a history of the object can be recorded by the ECU 107. The ECU 107 may also determine characteristics of the object based on the bounding box 305. For example, a height of the object may be determined based on the height of the bounding box 305 for that object.

Figure 4:
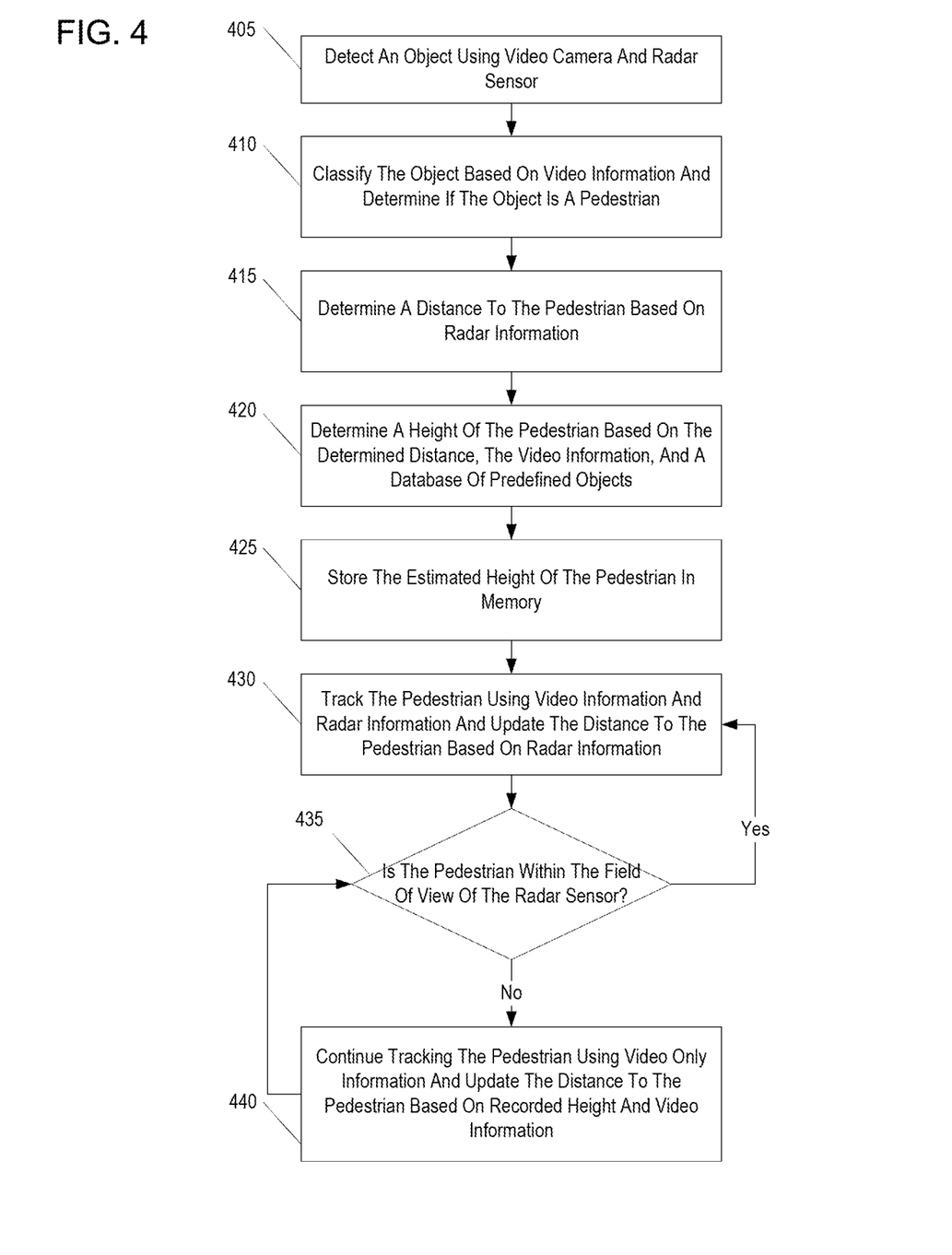
FIG. 4 is a flowchart of a method of monitoring a vehicle's surroundings with the active braking system for pedestrians of FIG. 1.

FIG. 4 is a flowchart 400 of a method of monitoring pedestrians using the active braking system for pedestrians 100 of FIG. 1. In one embodiment, the ECU 107 executes a program that includes the following steps. The ECU 107 receives information from the radar sensor 109 and the video camera 111. The ECU 107 analyzes the video information and detects objects using a bounding box 305 (step 405). In some embodiments, the ECU 107 fuses together the radar information and the video information. Once the information is fused, the ECU 107 can cross-match and compare objects in the video information with objects in the radar information. Once the objects are detected, the ECU 107 classifies the objects based on the video information (step 410). The classification may be performed by a classifier (not illustrated) within the ECU 107. In such a case, the classifier is preprogrammed through machine learning with objects of classification groups containing common features. Classification may include comparing one or more features of the detected objects to one or more features of objects within a database of the ECU 107. The database may include a plurality of image models representing pedestrians and other objects. The classification may also include comparing objects in each bounding box 305 to other objects in the video information. Additionally, the ECU 107 may use a combination of approaches to classify the objects including both comparisons of features in the video information to similar features of objects in the database and to features of other objects that have been recognized in the video information. The ECU 107 may classify the object as a pedestrian if features of the object match one or more predefined characteristics of a pedestrian in the database. Different classes and poses of pedestrians may also be determined based on predefined characteristics. For example, an object classified as a pedestrian may be further classified as an adult, a child, a running pedestrian, a bicyclist, and others. Depending on the context of the language stated herein, it should be understood that an object or an object classified as a pedestrian may refer to information within the ECU 107 representative of the object or the object classified as a pedestrian.

Once a pedestrian is detected and classified, the ECU 107 determines the distance to the pedestrian based on the radar information (step 415). Then, the ECU 107 determines characteristics of the pedestrian including an estimated height of the pedestrian based on the determined distance, the bounding box 305, and predefined characteristics (step 420). The characteristics including the height of the pedestrian are stored in memory 225 for later use (step 425). The ECU 107 tracks the pedestrian using the bounding box 305 based on the video information, and the ECU 107 regularly updates information about the pedestrian, such as detection, classification, and characteristic determination provided the pedestrian is in range of both of the radar sensor 109 and the video camera 111 (step 430). Updating the information about the pedestrian may include continuously repeating steps 405-430 and updating the classification, the distance, and the characteristics of the pedestrian at regular intervals while the pedestrian is in the field of view of both the video camera 111 and the radar sensor 109. As long as the pedestrian remains in the field of view of the radar sensor 109, the ECU 107 continues to track and update information as in step 430 (step 435). However, if the pedestrian is no longer within the field of view of the radar sensor 109 (step 435), the ECU 107 tracks the pedestrian using the video information and the recorded characteristics of the pedestrian (step 440). Due to the lack of updated radar information, the ECU 107 uses the recorded characteristics of the pedestrian to recalculate the distance to the pedestrian based only on the video information. Since the characteristics, including the estimated height, was determined based in part on a distance measurement from the radar sensor 109, which is more accurate than an estimated distanced based on the video camera 111, the re-determined distance to the pedestrian is more accurate than a re-determination based solely on the video information. In the event that the pedestrian returns to the field of view of the radar sensor 109, the radar information is combined with the video information to at least update the distance of a pedestrian or other object from the vehicle 103.

Figure 5:
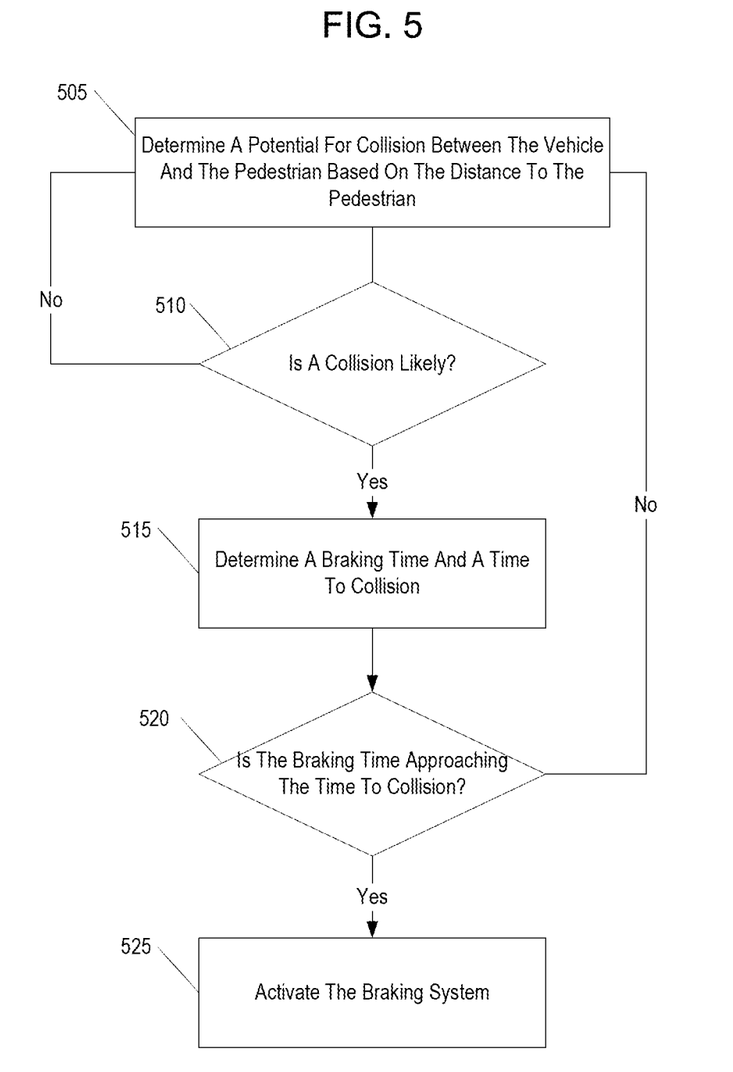
FIG. 5 is a flowchart of a method of controlling the vehicle based on the active braking system for pedestrians of FIG. 1.

FIG. 5 is a flowchart 500 of a vehicle control reaction based on the monitoring information obtained in the method of FIG. 4. In one embodiment, the steps illustrated in FIG. 4 are performed by an algorithm or program executed by the electronic processing unit 205 of the ECU 107. As the ECU 107 is performing the monitoring method, the ECU 107 performs the control reaction. During monitoring, the ECU 107 determines a potential for collision between the vehicle 103 and the pedestrian (step 505). The ECU 107 may factor in various parameters when determining a potential for collision. For example, the ECU 107 may take the distance between the vehicle 103 and the pedestrian, a speed of the vehicle 103, and a direction of the vehicle 103 into account when determining the potential for collision. The ECU 107 may also consider a direction and a speed that the pedestrian is moving based on tracking of the bounding box 305 associated with the pedestrian. Based on these factors, if the ECU 107 does not determine that a collision is likely, the ECU 107 continues to repeat the preceding steps (i.e., steps 505-510). Conversely, if the ECU 107 determines that a collision is likely, the ECU 107 determines a braking time and in some embodiments, a time to collision, based on the distance to the pedestrian and the speed of the vehicle 103 (step 515). The braking time may also be based on pre-defined characteristics of the vehicle 103. For example, the braking time may integrate into the determination a maximum deceleration of the vehicle 103 based on the vehicle's known braking characteristics. In addition, the ECU 107 may determine a time to collision between the vehicle 103 and the pedestrian assuming that the vehicle 103 and the pedestrian do not change course or speed before collision. The ECU 107 determines, from the braking time, a latest possible braking moment to avoid collision with the pedestrian. In some embodiments, when the braking time approaches the time to collision (step 520), the ECU 107 sends a command to the braking system 105 to stop the vehicle 103 (step 525). In this way, the vehicle 103 brakes in time to avoid a collision with the pedestrian. In other embodiments, the ECU 107 performs other automatic, evasive driving maneuvers based on the time to collision.

In some embodiments, the ECU 107 is configured to activate the braking system 105, based on the braking time, such that the braking system 105 activates as late as possible to avoid collision with the pedestrian 610. In such a case, a driver of the vehicle 103 experiences fewer active braking situations. This is advantageous in situations where active braking is not necessary to avoid a collision. This is because active braking removes some control of the vehicle 103 from the driver. False activations (e.g., activations that are not necessary to prevent a collision) are undesirable both because they impart a sudden shock to the driver and because they may incur other safety risks.

In other embodiments, the braking time may also include a factor of safety (i.e., a safety margin). The braking time with a factor of safety provides a higher estimate of braking time than that determined for simply the latest possible braking moment. The factor of safety imparts a greater potential to avoid collision. The factor of safety helps compensate for braking situations that are not ideal, such as, for example, wet road surface conditions, road inclination, old tires, and others.

Figure 6:
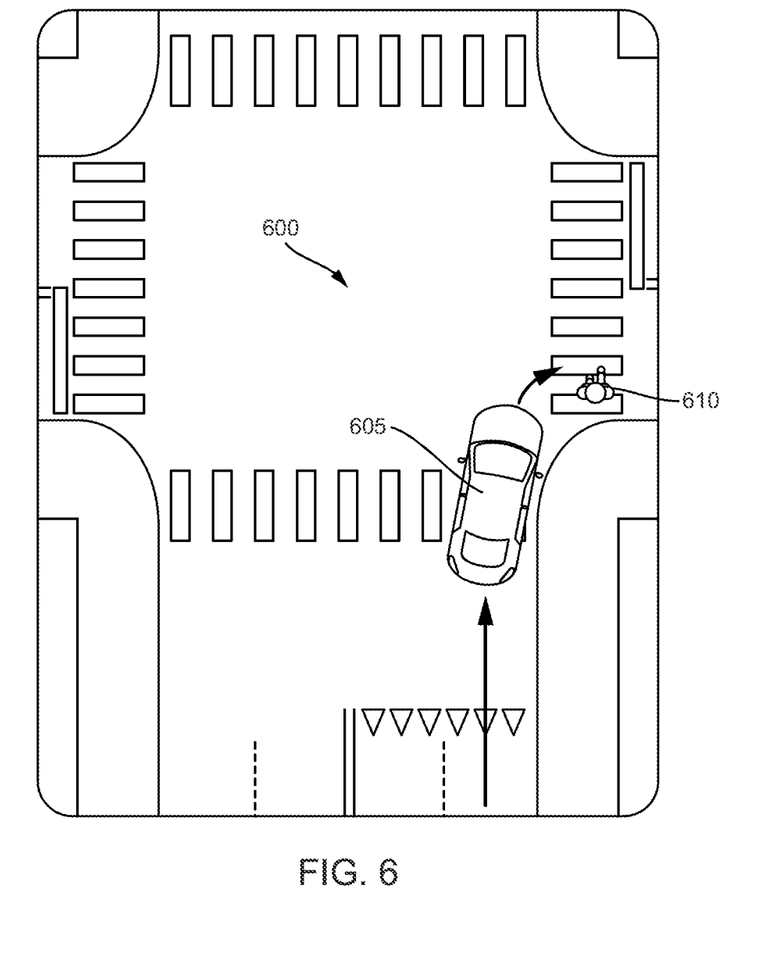
FIG. 6 is a diagram of a traffic situation having a potential for activation of the active braking system for pedestrians of FIG. 1.

FIG. 6 illustrates a situation in which a vehicle 605 equipped with the active braking system for pedestrians 100 may activate the braking system 105 for a pedestrian 610. As the vehicle 605 approaches an intersection 600, the radar sensor 109 and the video camera 111 detect the pedestrian walking along the side of the road (e.g., on a sidewalk). A bounding box is associated with the pedestrian by the ECU 107 according to the method of FIG. 4. When the vehicle 605 is still some distance away, the radar sensor 109 detects the pedestrian 610. Then the ECU 107 classifies the pedestrian 610 as a pedestrian based on the video information, the distance, and known features of a pedestrian stored in the database. The ECU 107 also estimates the height of the pedestrian 610 and records the height in memory. As the vehicle 605 gets close to the pedestrian 610, an angle between the direction of movement of the vehicle 605 and a location of the pedestrian 610 increases. In other words, the pedestrian 610 begins to move to the edge of the field of view of the radar sensor 109. At a certain point, the pedestrian 610 is no longer in the field of view of the radar sensor 109, but remains in the field of view of the video camera 111. The ECU 107 continues to track the pedestrian 610 using only the video information and the recorded height of the pedestrian 610. If the vehicle 605 then makes a right turn at the intersection 600 at the same time as the pedestrian 610 is crossing, the ECU 107 determines that there is a potential for collision and activates the braking system 105 at the latest possible moment to prevent a collision.

In the situation depicted in FIG. 6, the ECU 107 determines the braking time based on the determined distance to the pedestrian 610 as determined from the video information without the benefit of the radar information due to a wide field of view of the video camera 111 as compared to a field of view of the radar sensor 109. In these situations, it is beneficial to determine the distance to the pedestrian 610 based in part on the stored height of the pedestrian 610 or other characteristics of the pedestrian 610 rather than using a continuously calculated height based on the video information. By using the stored height rather than a recalculated height, the determination of distance to the pedestrian 610 is more accurate, and therefore, stopping time is determined more accurately. This improves safety, while reducing false active braking events.

Continuing with the example illustrated in FIG. 6, the vehicle 605 may have the right-away to proceed with a right turn (e.g., a right-turn arrow) despite the presence of the pedestrian 610 curbside. In such a case, the pedestrian 610 may approach the curb and then come to an abrupt stop at curbside due to a red traffic signal. The ECU 107 may determine that a potential for collision is present and may activate the braking system for pedestrians despite there being little risk of collision. In this case, it is best to activate the active braking as late as possible to avoid an unnecessary activation. Since the ECU 107 uses the stored characteristics of the pedestrian 610 to determine an updated distance as the vehicle 605 approaches the pedestrian 610, the braking time can be delayed because of the higher accuracy of the distance determination by the ECU 107.

Thus, the invention provides, among other things, an active braking system for pedestrians based on video and radar information. The ECU 107 fuses radar and video information to develop characteristics of the pedestrian, which are later used to perform distance measurements. Various features and advantages of the invention are set forth in the following claims.

What is claimed is:

1. A method of operating a pedestrian collision avoidance system on a vehicle, the method comprising:

sensing a surrounding area of the vehicle with a radar sensor having a field of view and a video camera, the video camera having a wider field of view than the radar sensor;

sending radar information from the radar sensor and video information from the video camera to an electronic control unit;

detecting an object in the video information with the electronic control unit;

classifying the object as a pedestrian based on a comparison of the video information with a database;

determining, with the electronic control unit, a distance between, based on the radar information, an object classified as a pedestrian and the vehicle;

determining, with the electronic control unit, a characteristic of the object classified as a pedestrian based on the video information, the distance, and the database;

storing the characteristic of the object classified as a pedestrian in memory;

when the object classified as a pedestrian ceases to be detected by the radar sensor as the object is outside the field of view of the radar sensor and within the field of view of the video camera, determining, with the electronic control unit, an updated distance to the object classified as a pedestrian based on the video information and the characteristic of the object classified as a pedestrian;

determining, with the electronic control unit, whether a potential for collision between the vehicle and the object classified as a pedestrian is present based in part on the distance to the object classified as a pedestrian; and when the potential for collision is present, activating an automatic vehicle response.

2. The method of claim 1, wherein the detecting of an object includes tracking an object using a bounding box of the video information and wherein determining a characteristic of the object classified as a pedestrian includes determining a height of the object classified as a pedestrian based on the bounding box of the video information.

3. The method of claim 1, wherein classifying the object as a pedestrian includes comparing a height of the object classified as a pedestrian with a height of one or more other detected objects in the video information.

4. The method of claim 1, wherein classifying the object as a pedestrian includes comparing a height of the object classified as a pedestrian from the video information to a height of a plurality of stored image models representing different classes of pedestrians in different poses.

5. The method of claim 1, further comprising:
when the object classified as a pedestrian is in a field of view of both the radar sensor and the video camera, updating the distance determination, with the electronic control unit, based on the radar information and the video information, and
when the object classified as a pedestrian is in the field of view of only the video camera, updating the distance determination, with the electronic control unit, based at least in part on the stored characteristic of the object classified as a pedestrian.

6. The method of claim 5, wherein the stored characteristic of the object classified as a pedestrian is a height of the object classified as a pedestrian.

7. The method of claim 5, further comprising determining whether a potential for collision between the vehicle and the object classified as a pedestrian is present, with the electronic control unit, based on the updated distance determination.

8. The method of claim 1, wherein an automatic vehicle response includes determining a braking time, with the electronic control unit, the braking time being a time to apply braking to avoid a collision between the object classified as a pedestrian and the vehicle; and activating a braking system based on the braking time.

9. The method of claim 8, wherein the braking time is determined based on known braking characteristics of the vehicle and a safety margin.

10. The method of claim 8, further comprising calculating a time to collision, with the electronic control unit, between the vehicle and the object classified as a pedestrian and activating the braking system when the time to collision approaches the braking time.

11. The method of claim 1, wherein determining a distance to the object classified as a pedestrian includes comparing detected objects determined from the video information with detected objects determined from the radar information.

12. The method of claim 1, wherein determining whether a potential for collision between the vehicle and the object classified as a pedestrian is present is also based on speed and direction of the vehicle.

13. The method of claim 1, wherein the radar sensor is a long-range radar sensor.

14. A pedestrian collision avoidance system for a vehicle, the system comprising:
a radar sensor positioned on the vehicle, the radar sensor having a field of view;
a video camera positioned on the vehicle, the video camera having a wider field of view than the radar sensor;
an electronic control unit, electrically connected to the radar sensor and the video camera, the electronic control unit configured to
sense a surrounding area of the vehicle with the radar sensor and the video camera;
receive radar information from the radar sensor and video information from the video camera;
detect an object in the video information;
classify the object as a pedestrian based on a comparison of the video information with a database;
determine a distance between, based on the radar information, an object classified as a pedestrian and the vehicle;
determine a characteristic of the object classified as a pedestrian based on the video information, the distance, and the database;
store the characteristic of the object classified as a pedestrian in memory;
when the object classified as a pedestrian ceases to be detected by the radar sensor as the object is outside the field of view of the radar sensor and within the field of view of the video camera, determining an updated distance to the object classified as a pedestrian based on the video information and the characteristic of the object classified as a pedestrian;
determine whether a potential for collision between the vehicle and the object classified as a pedestrian is present based in part on the distance to the object classified as a pedestrian; and
when the potential for collision is present, activate an automatic vehicle response.

15. The pedestrian collision avoidance system of claim 14, wherein the electronic control unit is further configured to track the object using a bounding box of the video information and determine a height of the object classified as a pedestrian based on the bounding box of the video information.

16. The pedestrian collision avoidance system of claim 14, wherein the electronic control unit is further configured to compare a height of the object classified as a pedestrian with a height of one or more other detected objects in the video information.

17. The pedestrian collision avoidance system of claim 14, wherein the electronic control unit is further configured to compare a height of the object classified as a pedestrian from the video information to a height of a plurality of stored image models representing different classes of pedestrians in different poses.

18. The pedestrian collision avoidance system of claim 14, wherein the electronic control unit is further configured to when the object classified as a pedestrian is in a field of view of both of the radar sensor and the video camera, update the distance determination based on the radar information and the video information, and when the object classified as a pedestrian is in the field of view of only the video camera, update the distance determination based at least in part on the stored characteristic of the object classified as a pedestrian.

19. The pedestrian collision avoidance system of claim 18, wherein the stored characteristic of the object classified as a pedestrian is a height of the object classified as a pedestrian.

20. The pedestrian collision avoidance system of claim 18, wherein the electronic control unit is further configured to determine whether a potential for collision between the vehicle and the object classified as a pedestrian is present based on the updated distance determination.

21. The pedestrian collision avoidance system of claim 14, wherein an automatic vehicle response includes determining a braking time, the braking time being a time to apply braking to avoid a collision between the object classified as a pedestrian and the vehicle; and activating a braking system based on the braking time.

22. The pedestrian collision avoidance system of claim 21, wherein the braking time is determined based on known braking characteristics of the vehicle and a safety margin, and wherein the radar sensor is a long-range radar sensor.

23. A The pedestrian collision avoidance system for a vehicle, the system comprising:
- a radar sensor positioned on the vehicle, the radar sensor having a field of view;
- a video camera positioned on the vehicle, the video camera having a wider field of view than the radar sensor;
- an electronic control unit, electrically connected to the radar sensor and the video camera, the electronic control unit configured to
  - sense a surrounding area of the vehicle with the radar sensor and the video camera;
  - receive radar information from the radar sensor and video information from the video camera;
  - detect an object in the video information;
  - classify the object as a pedestrian based on a comparison of the video information with a database;
  - determine a distance between, based on the radar information, an object classified as a pedestrian and the vehicle;
  - determine a characteristic of the object classified as a pedestrian based on the video information, the distance, and the database;
  - store the characteristic of the object classified as a pedestrian in memory;
  - when the object classified as a pedestrian is in a field of view of both of the radar sensor and the video camera, update the distance determination based on the radar information and the video information;
  - when the object classified as a pedestrian ceases to be detected by the radar sensor as the object is outside the field of view of the radar sensor and within the field of view of the video camera, determining an updated distance to the object classified as a pedestrian based on the video information and the characteristic of the object classified as a pedestrian;
  - determine whether a potential for collision between the vehicle and the object classified as a pedestrian is present based in part on the distance to the object classified as a pedestrian; and
  - when the potential for collision is present, activate an automatic vehicle response.

24. The pedestrian collision avoidance system of claim 23, wherein the stored characteristic of the object classified as a pedestrian is a height of the object classified as a pedestrian, and when the object ceases to be detected by the radar sensor, the determining of the updated distance is based on a height of the object determined from updated video information and the height of the object previously stored in the memory as the characteristic.

* * * * *

UNITED STATES PATENT AND TRADEMARK OFFICE
CERTIFICATE OF CORRECTION

PATENT NO. : 10,444,346 B2
APPLICATION NO. : 15/327914
DATED : October 15, 2019
INVENTOR(S) : Thomas Voorheis and Oliver F. Schwindt It is certified that error appears in the above-identified patent and that said Letters Patent is hereby corrected as shown below:

In the Claims

Column 11, Line 28: replace "A The pedestrian" with --A pedestrian--

Signed and Sealed this
Twenty-sixth Day of May, 2020

Andrei Iancu
*Director of the United States Patent and Trademark Office*